(12) United States Patent
Wurtenberger et al.

(10) Patent No.: US 8,593,982 B1
(45) Date of Patent: Nov. 26, 2013

(54) METHOD AND SYSTEM FOR OPTIMIZING A PERFORMANCE INDICATOR LOG MASK

(75) Inventors: Andrew Mark Wurtenberger, Olathe, KS (US); Caleb S. Hyde, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 392 days.

(21) Appl. No.: 12/938,210

(22) Filed: Nov. 2, 2010

(51) Int. Cl.
*H04L 1/00* (2006.01)

(52) U.S. Cl.
USPC ........... 370/252; 709/223; 709/224; 709/225; 709/226

(58) Field of Classification Search
USPC ........... 370/252, 254, 278, 337, 445; 455/454
See application file for complete search history.

(56) References Cited

U.S. PATENT DOCUMENTS

| | | | | |
|---|---|---|---|---|
| 7,349,360 B2 * | 3/2008 | Gutierrez et al. | ............. | 370/315 |
| 7,369,511 B2 * | 5/2008 | Utsunomiya et al. | ......... | 370/252 |
| 7,502,350 B2 * | 3/2009 | Sugita | ............ | 370/337 |
| 7,593,347 B2 * | 9/2009 | Maltsev et al. | ................ | 370/252 |
| 7,593,356 B1 * | 9/2009 | Friday et al. | .................... | 370/278 |
| 7,613,210 B2 * | 11/2009 | Takehara | ...................... | 370/503 |
| 7,630,323 B2 * | 12/2009 | Bridgelall | ....................... | 370/254 |
| 7,804,842 B2 * | 9/2010 | Malik et al. | .................... | 370/445 |
| 7,830,812 B2 * | 11/2010 | Atkins et al. | ................... | 370/252 |
| 7,940,686 B2 * | 5/2011 | Lehew et al. | .................. | 370/252 |
| 2003/0041046 A1 | 2/2003 | Allison et al. | | |
| 2008/0004035 A1* | 1/2008 | Atkins et al. | .................. | 455/454 |
| 2008/0081632 A1 | 4/2008 | Malik | | |
| 2009/0111382 A1 | 4/2009 | Yao | | |
| 2009/0135731 A1* | 5/2009 | Secades et al. | ............... | 370/252 |
| 2009/0135817 A1* | 5/2009 | Hulusi et al. | .................. | 370/389 |
| 2009/0323542 A1* | 12/2009 | Aiba et al. | ..................... | 370/252 |
| 2011/0026429 A1* | 2/2011 | Ben Slimane et al. | ........ | 370/252 |
| 2011/0158110 A1* | 6/2011 | Stacey et al. | ................... | 370/252 |
| 2012/0057491 A1* | 3/2012 | Tiirola et al. | .................. | 370/252 |

* cited by examiner

Primary Examiner — Charles C Jiang

(57) ABSTRACT

A method and system to generate a communication system performance indicator log mask is disclosed. The method includes receiving, by a processing unit, a request for a performance indicator log mask associated with a performance indicator of a communication system, retrieving, by the processing unit, a plurality of log mask values associated with the performance indicator from a storage unit, and combining, by the processing unit, the plurality of log mask values to generate the performance indicator log mask.

20 Claims, 5 Drawing Sheets

METHOD AND SYSTEM FOR OPTIMIZING A PERFORMANCE INDICATOR LOG MASK

TECHNICAL BACKGROUND

Communication systems, and particularly wireless communication systems, have become an important means by which many people worldwide have come to communicate. A wireless communication system may provide communication between wireless devices, and/or between wireless and wired devices.

As the size and complexity of communication systems increase, the need for efficient and effective evaluation of a communication system's performance also increases. Although diagnostic monitors are available to capture information relevant to the performance of communication systems, configuration of such systems is complex, and improper configuration may lead to capturing too much or not enough information to efficiently and effectively evaluate the communication system.

OVERVIEW

A method to generate a communication system performance indicator log mask is disclosed. The method includes receiving, by a processing unit, a request for a performance indicator log mask associated with a performance indicator of a communication system, retrieving, by the processing unit, a plurality of log mask values associated with the performance indicator from a storage unit, and combining, by the processing unit, the plurality of log mask values to generate the performance indicator log mask.

Furthermore, a system for evaluating a communication system is disclosed. The system includes a processing unit, a storage unit coupled to the processing unit, a user interface coupled to the processing unit configured to receive user input and provide user output, and a communication system interface coupled to the processing unit configured to monitor a performance of the communication system.

The processing unit of the system may be configured to receive a request for a log including data associated with a performance indicator of a plurality of performance indicators of the communication system, determine a performance indicator log mask based on the performance indicator, and collect the log comprising data associated with the performance indicator based on the performance indicator log mask.

DETAILED DESCRIPTION

It is to be understood that the foregoing general description, the following detailed description, and the accompanying drawings, are exemplary and explanatory only and are not restrictive of the present invention, as claimed. The following detailed description and accompanying drawings teach the best mode of the invention. For the purpose of teaching inventive principles, some conventional aspects of the best mode may be simplified or omitted.

The appended claims specify the scope of the invention. Note that some aspects of the best mode may not fall within the scope of the invention as specified by the claims. Thus, those skilled in the art will appreciate variations from the best mode that fall within the scope of the invention. Those skilled in the art will also appreciate that the features described below can be combined in various ways to form multiple variations of the invention. As a result, the invention is not limited to the specific examples described below, but only by the claims and their equivalents.

Figure 1:
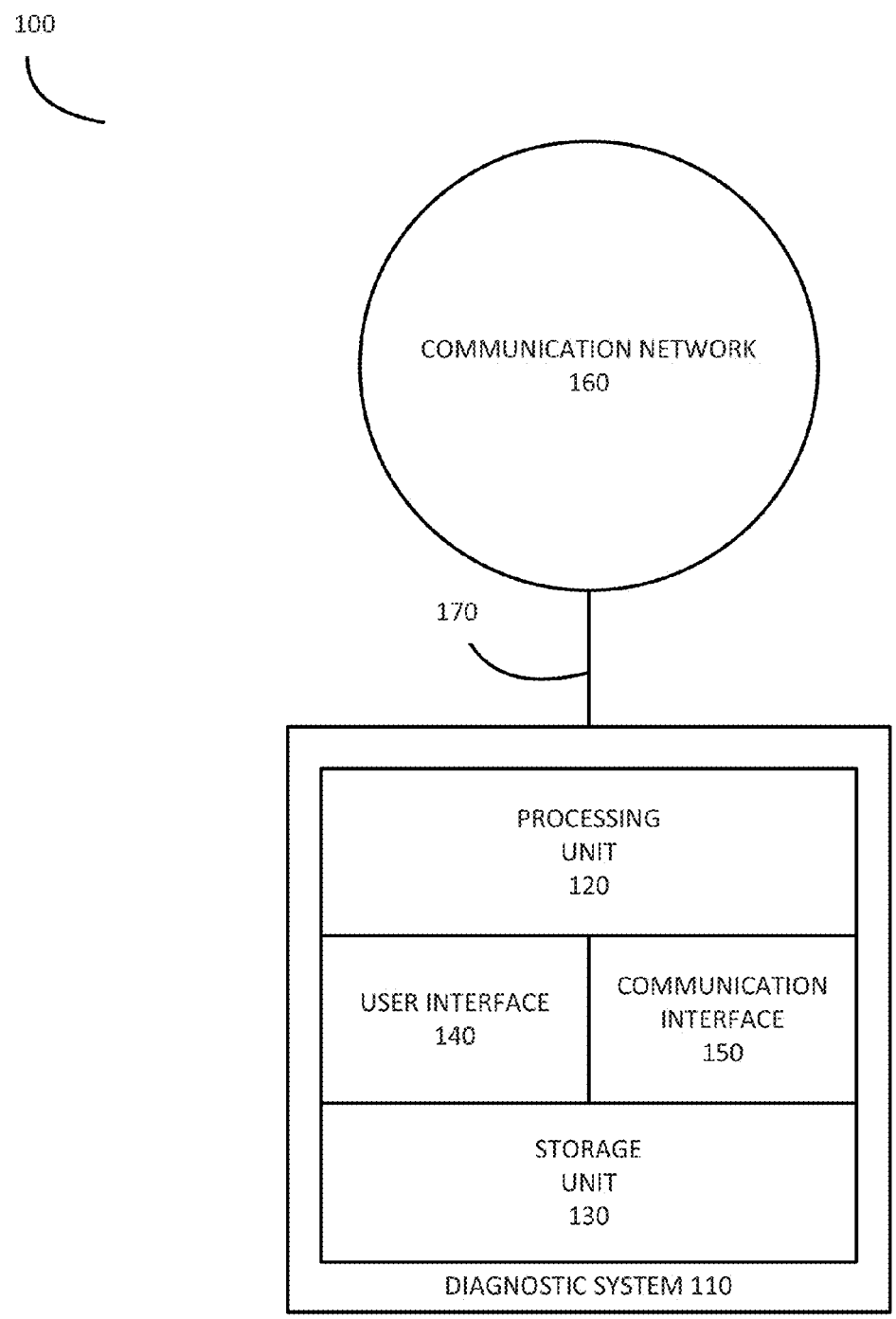
FIG. 1 includes a schematic diagram of an exemplary embodiment of the present teachings.

FIG. 1 illustrates a communication system 100 of an exemplary embodiment. Communication system 100 includes a communication network 160 and a diagnostic system 110 coupled to communication network 160 through communication link 170. In operation, diagnostic system 110 receives a request for a performance indicator log mask associated with a performance indicator of communication network 160. Upon receipt, diagnostic system 110 retrieves a plurality of log mask values associated with the performance indicator from an internal storage unit 130 and combines the plurality of log mask values to generate the requested performance indicator log mask. Diagnostic system 110 may analyze the performance of the communication network 160 based on the performance indicator log mask, or may provide the performance indicator log mask to a user or to another device for further processing.

Communication network 160 may support one or more communication protocols, such as Code Division Multiple Access (CDMA), Evolution Data Only (EVDO), Worldwide Interoperability for Microwave Access (WiMAX), Global System for Mobile Communication (GSM), Long Term Evolution (LTE), Wireless Fidelity (WIFI), High Speed Packet Access (HSPA), or some other communication protocol. Communication link 170 may be a wireless link which may use the air or space as its transport media and may use various protocols for communicating data, such as iDEN, CDMA, EVDO, WiMAX, GSM, LTE, WIFI, HSPA, or some other communication protocol. Communication link 170 may also be a wired link which may use metal, glass, or some other material as the transport media and may use various protocols for communicating data, such as Internet Protocol (IP), Ethernet, or some other communication format. Communication link 170 may also be a combination of wireless and wired links.

Diagnostic system 110 includes processing unit 120, user interface 140, communication interface 150, and storage unit 130. Processing unit 120 may include one or more processors and other circuitry that executes software retrieved from storage unit 130 or from an external storage unit (not shown). When executed by processing unit 120, the software directs processing unit 120 to operate diagnostic system 110 as described herein. Processing unit 120 may be mounted on a circuit board which may further hold storage unit 130, communication interface 150, user interface 140, or portions thereof.

Communication interface 150 may include communication circuitry to interface wirelessly or in wired manner with communication network 160. Communication circuitry may include an amplifier, filter, RF modulator, signal processing circuitry and/or any other component which may allow the communication interface to communicate with the communications network via a wireless link, a fiber optic cable, a coax cable, or any other communication format. Communication interface 160 may also include internal processing and storage circuitry, software, or some other communication device (not shown).

User interface 140 may include user input/output elements such as keyboard, keypad, display, touch-screen display, or a combination thereof. User interface 140 may also include user data input/output elements such as USB port, smart card reader, CD drive, infra red port, or a combination thereof.

Figure 2:
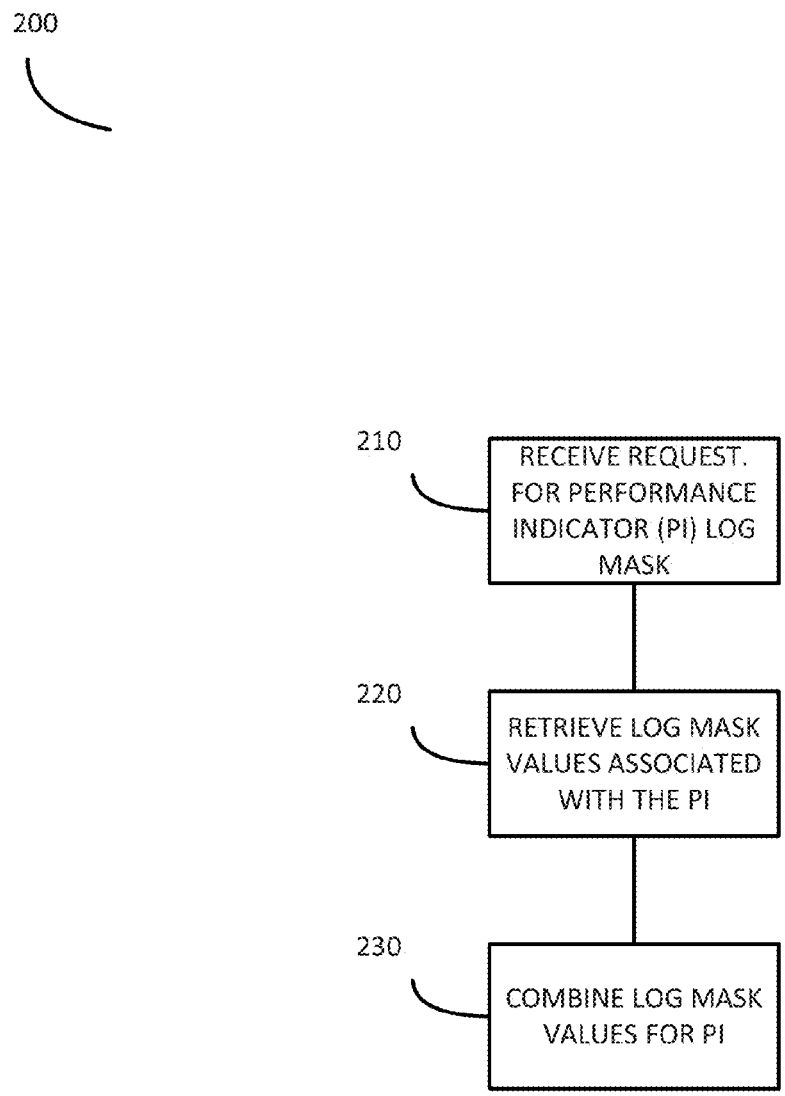
FIG. 2 includes a flowchart illustrating a process of an exemplary embodiment of the present teachings.

FIG. 2 illustrates a process 200 according to an exemplary embodiment for operating diagnostic system 110. Processing unit 120 receives a request for a key performance indicator (KPI) log mask (210). Processing unit 120 communicates with storage unit 130 to retrieve a plurality of log mask values associated with the KPI of the request (220). Processing unit 120 combines the plurality of log mask values to yield the requested KPI log mask value (230).

The request for the KPI log mask may be received by diagnostic system 110 from a user through user interface 140, from communication network 160 through communication interface 150, or may be generated by an internal process of the diagnostic system 110. Furthermore, one or more log mask values of the plurality of log mask values may be retrieved from sources other than storage unit 130, such as an external storage (not shown) or another communication network (not shown). Further still, the resulting KPI log mask value may be used by the diagnostic system for further processing, may be provided to the user through user interface 140, or may be provided to another user or device through communication interface 130.

Figure 3:
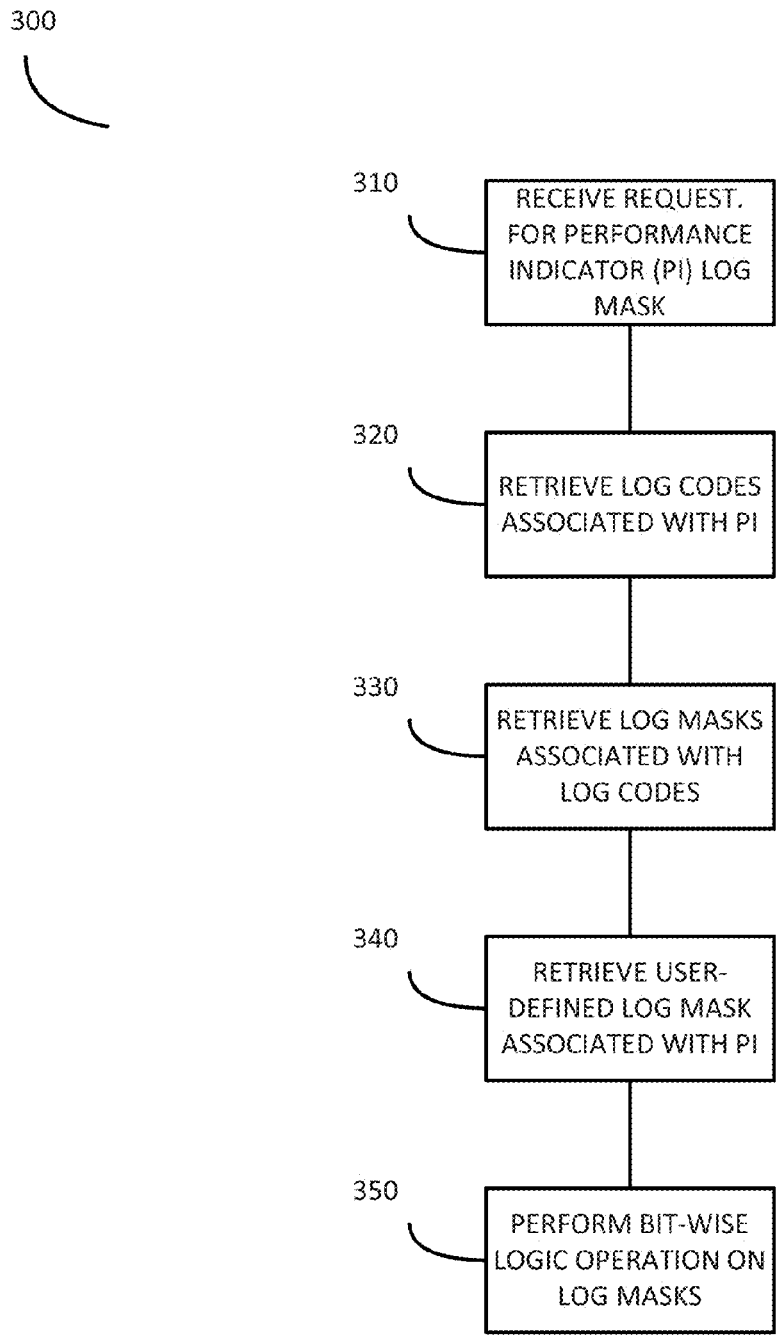
FIG. 3 includes a flowchart illustrating a process of an exemplary embodiment of the present teachings.

FIG. 3 illustrates a process 300 according to another exemplary embodiment for operating diagnostic system 110. Processing unit 120 receives a request for a key performance indicator (KPI) log mask (310). Processing unit 120 communicates with storage unit 130 to retrieve a plurality of log codes associated with the KPI of the request (320). Processing unit 120 communicates with storage unit 130 to further retrieve a plurality of log mask values associated with the plurality of log codes (330). Processing unit 120 further communicates with storage unit 130 to also retrieve a user-defined log mask associated with the request (340). Processing unit 120 combines the plurality of log mask values to yield the requested KPI log mask value. The log mask values are combined by performing, for example, a bit-wise 'OR' operation on the retrieved log masks (350).

For example, and not as limitation, a user of the present embodiment may request diagnostic system 110 a KPI, such as 1xRTT access attempts. The processing unit 120 may retrieve from storage unit 130 a list of log codes associated with the KPI, such as access channel messages (log mask 0x02) and access probe information (log mask 0x08). The processing unit 120 retrieves from storage unit 130 log masks associated with the log codes above and performs a bit-wise 'OR' operation to yield the desired KPI log mask. For the above log codes the resulting log mask is 0x0A (i.e., bit-wise 'OR' of 0x02 and 0x08).

The user-defined log mask allows the user to limit or expand the amount of log messages that would be provided by that combination of log codes retrieved from storage unit 130. For example, a user may not want to log a particular type of message triggered by a log mask of 0x0A, even though one or more of the retrieved log codes are associated with log masks which select the particular type of message. In such a case, the user may provide the log mask value of 0x02 which, when "XORed" with the retrieved log mask, would "zero" the bit at position 1 of the log mask (i.e., 0x02). Thus, a log recorded based on the resulting log mask would not include messages triggered by a log mask of 0x02.

Although the above description is directed to an embodiment in which the user-defined log mask is used to eliminate a type of message from a log, the present teachings are not so limited. The user-defined log mask may be used to add types of log messages by configuring the diagnostic system to perform an "OR" operation when combining the user-defined log mask with the other "ORed" log masks. For example, if a user wishes to log a type of message triggered by a log mask of 0x0A, the user may provide the log mask value of 0x0A as the user-defined log mask and may instruct the diagnostic system to bit-wise "OR" the user-defined log mask to include messages. The operation would "one" the bits at positions 1 and 3 of the resulting log mask (i.e., 0x0A).

The request for the KPI log mask may be received from the user through user interface 140, from communication network 160 through the communication interface 150, or may be generated by an internal process of the diagnostic system 110. Furthermore, one or more log mask values of the plurality of log mask values may be retrieved from sources other than storage unit 130, such as an external storage (not shown) or another communication network (not shown). Further still, the resulting KPI log mask value may be used by the diagnostic system for further processing, may be provided to the user through user interface 140, or may be provided to another user or device through communication interface 130.

Figure 4:
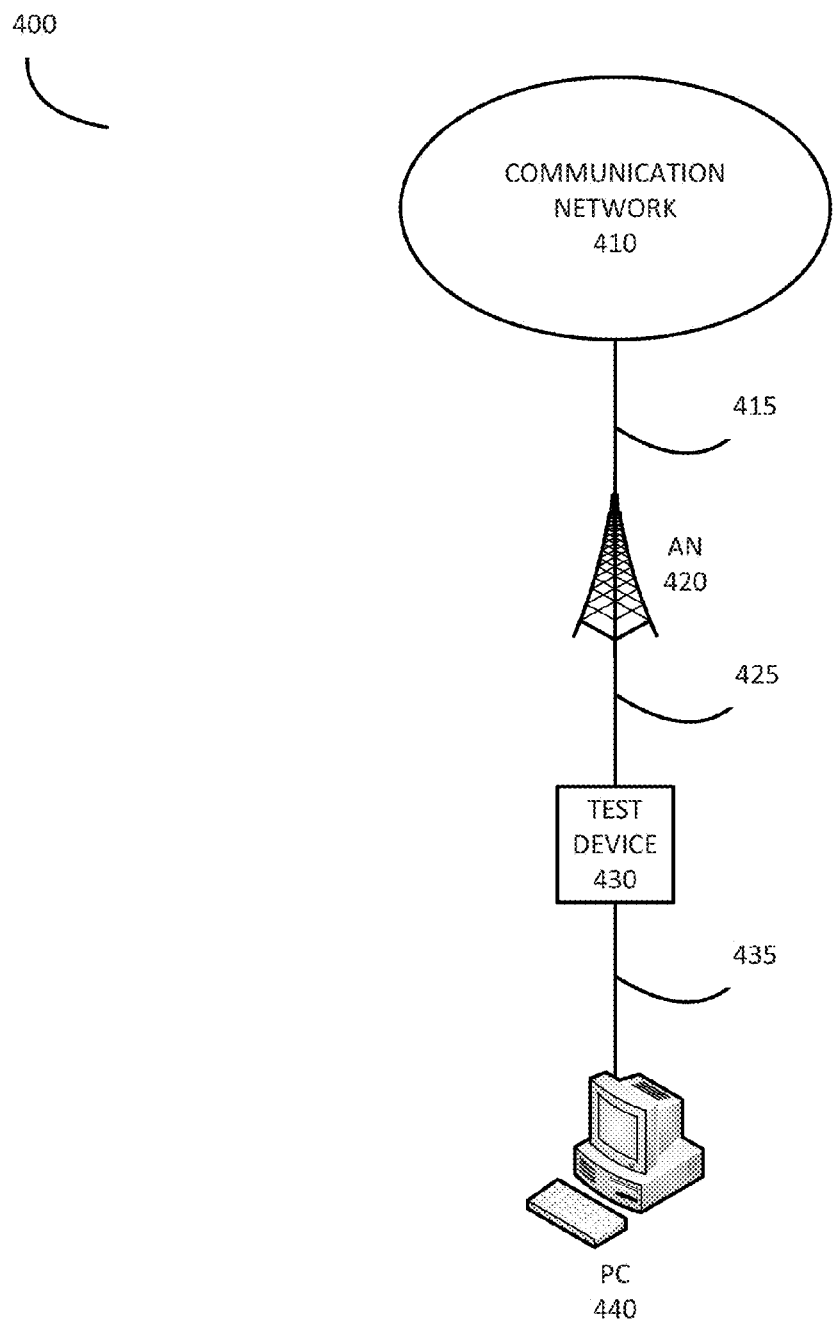
FIG. 4 includes a schematic diagram of an exemplary embodiment of the present teachings.

FIG. 4 illustrates a communication system 400 of an exemplary embodiment. Communication system 400 includes a wireless communication network 410, an access node 420, a test device 430, and a personal computer 440.

Wireless communication network 410 may support one or more communication protocols, such as CDMA, EVDO, WiMAX, GSM, LTE, WIFI, HSPA, or some other wireless communication protocol. Access node 420 communicates with wireless communication network 410 over communication link 415. Communication link 415 may use metal, glass, air, space, or some other material as the transport media and may use various communication protocols, such as Internet Protocol (IP), Ethernet, or some other communication format—including combinations thereof. Communication link 415 could be a direct link or may include intermediate networks, systems, or devices.

Access node 420 may include access node radios and control equipment contained in a bade transceiver station (BTS), or cell site. However, an access node according to the present embodiment is not so limited and may be configured differently. Access node 420 may be used to provide a link between the carrier network 110 and various wireless devices, such as test device 430, and may further provide connectively between wireless devices and other networks (not shown). Examples of external networks may be the Internet, a wide area network (WAN), a local area network (LAN), an intranet, another wireless communication network, or other type of packet-switch network.

Test device 430 is a wireless device of the type served by communication network 410 through access node 420. Test device 430 communicates with access node 420 over wireless link 425, which may use the air or space as its transport media and may use various wireless communication protocols, such as iDEN, CDMA, EVDO, WiMAX, GSM, LTE, WIFI, HSPA, or some other wireless communication protocol. Test device 430 may include any electronic device that may be used for voice and/or data communication over communication network 410. Examples of test device 430 include, but are not limited to, cellular phones, personal digital assistants (PDAs), handheld devices, wireless modems, laptop computers, and personal computers.

Personal computer (PC) 440 is a general purpose computer which may be configured to perform some or all functions of a diagnostic system described herein. General purpose computers are known in the art and generally include a user interface (e.g., monitor/display and keyboard), memory (e.g., RAM/ROM and hard disk drive), processing unit (e.g., one or more microprocessors), communication ports (e.g., USB), etc. . . . . . A detailed description of a known-in-the-art general purpose computer is omitted herein to not obscure the present teachings.

PC 440 communicates with test device 430 over communication link 435. Communication link 435 may use metal, glass, air, space, or some other material as the transport media and may use various communication protocols, such as Internet Protocol (IP), Ethernet, WIFI, Universal Serial Bus (USB), or some other communication format—including combinations thereof. Communication link 435 could be a direct link or may include intermediate networks, systems, or devices.

Figure 5:
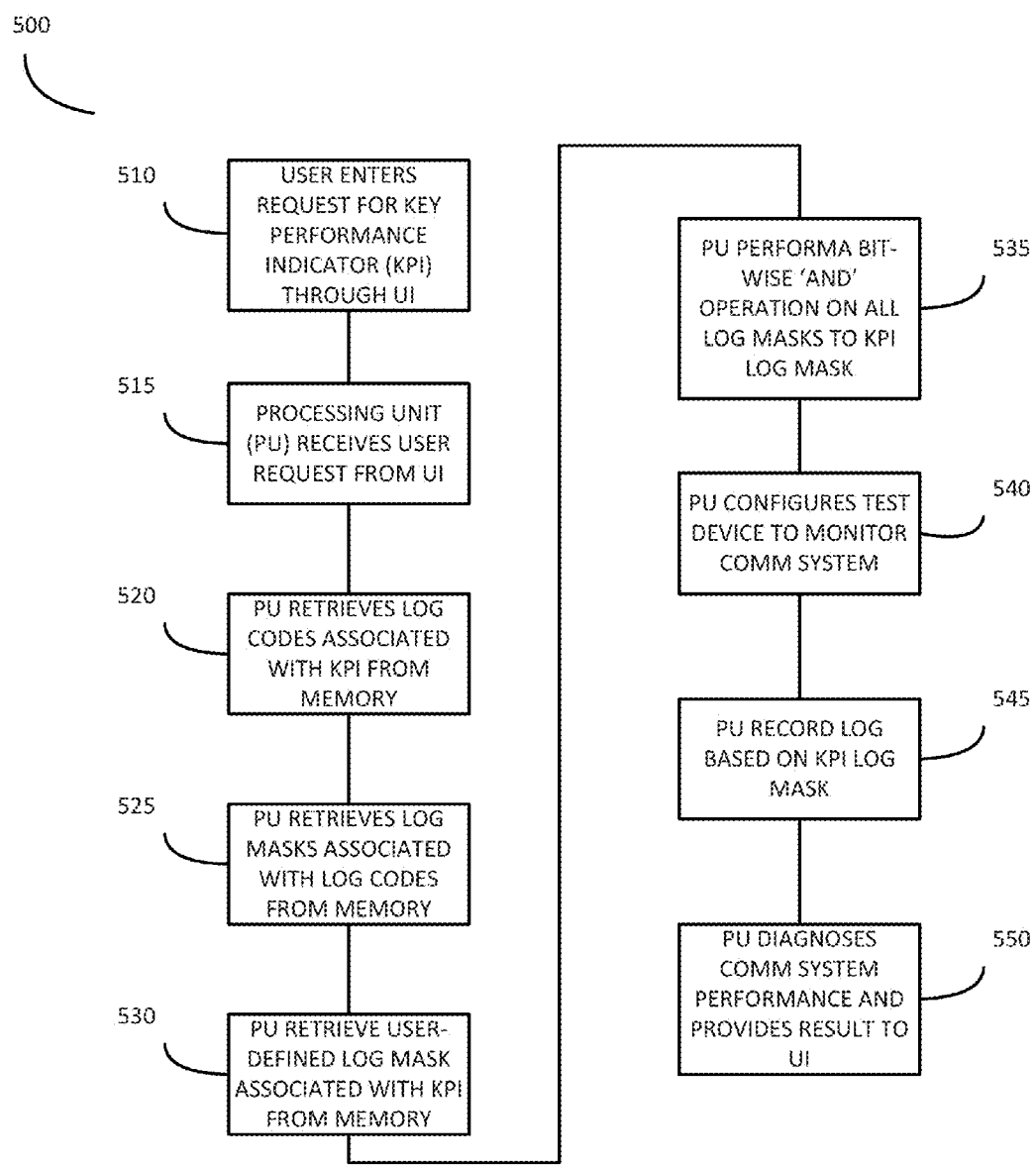
FIG. 5 includes a flowchart illustrating a process of an exemplary embodiment of the present teachings.

FIG. 5 illustrates a process 500 according to an exemplary embodiment for performing diagnostic tests using communication system 400. PC 440 is configured to execute software stored in its memory to perform diagnostic tests as described herein. A user enters a request for a key performance indicator (KPI) through PC 440's user interface (510). PC 440's processing unit receives the request from the user interface (515) and communicates with memory to retrieve a plurality of log codes associated with the requested KPI (520). PC 440's processing unit communicates with the memory to further retrieve a plurality of log mask values associated with the plurality of log codes (525). PC 440's processing unit further communicates with memory to retrieve a user-defined log mask associated with the request (530). The user-defined log mask may have been entered through the PC 440's user interface and submitted with the request or may have been previously entered and stored in memory. The PC 440's processing unit combines the plurality of log mask values to yield the requested KPI log mask value. The log mask values are combined by performing a bit-wise 'OR' operation on the retrieved log masks (535).

PC 440 communicates with test device 430 and configures test device 430 to monitor communication network 410 and transmit communication network information to PC 440 (540). The test device 430 may be configured to filter the information based on the KPI log mask (i.e., only log entries based on the KPI log mask), or may be configured to transmit all information to PC 440 and PC 440 filters the information based on the KPI log mask. PC 440 records the filtered information in a log file (545) and may further process the recorded information to provide to the user a KPI value (550).

The exemplary embodiments described herein can be embodied as computer-readable codes on a tangible computer-readable recording medium. The tangible computer-readable recording medium is any tangible storage device that can store data which can thereafter be read by a computer system. Examples of tangible computer-readable recording medium include, but are not limited to, read-only memory (ROM), random-access memory (RAM), CD-ROMs, magnetic tapes, floppy disks, and optical data storage devices. The tangible computer-readable recording medium can also be distributed over network-coupled computer systems so that the computer-readable code is stored and executed-in a distributed fashion.

The exemplary embodiments described herein can also be embodied as computer-readable codes embedded in communication signals transmitted through a transitory medium. The communication signals may include, for example, signals which modulate carrier waves transmitted through wired or wireless transmission paths.

The above description and associated figures teach the best mode of the invention. Other embodiments will be apparent to those skilled in the art from consideration of the specification and practice of the teachings disclosed herein. It is intended that the specification and examples be considered as exemplary only, with a true scope and spirit invention being indicated by the following claims.

What is claimed is:

1. A method of generating a performance indicator log mask comprising:
   receiving, by a processing unit of a diagnostic device, a request to generate a performance indicator log mask associated with a performance indicator of a wireless communication system from a user through a user interface of the diagnostic device;
   retrieving, by the processing unit of the diagnostic device, a plurality of log mask values associated with the performance indicator from a storage unit;
   combining, by the processing unit of the diagnostic device, the plurality of log mask values to generate the performance indicator log mask; and
   transmitting, by the processing unit of the diagnostic device, a signal to a wireless device to configure the wireless device to monitor the communication system based on the performance indicator log mask.

2. The method of claim 1, wherein the processing unit retrieves the plurality of log mask values by retrieving a plurality of log codes associated with the performance indicator from the storage unit and retrieving a log mask value associated with each log code of the plurality of log codes.

3. The method of claim 2, wherein the processing unit combines the plurality of log mask values by performing a bit-wise logic operation between a binary representation of each log mask value of the plurality of log mask values.

4. The method of claim 3, wherein the bit-wise logic operation is one of an XOR operation and an OR operation.

5. The method of claim 3, wherein retrieving the plurality of log mask values further comprises retrieving a user-defined performance indicator log mask from the storage unit.

6. The method of claim 3, wherein the communication system is a wireless communication system.

7. A method of evaluating a wireless communication system comprising:
   receiving, by a processing unit of a diagnostic device, a request to generate a log comprising data associated with a performance indicator of the wireless communication system from a user through a user interface of the diagnostic device;
   determining, by the processing unit of the diagnostic device, a performance indicator log mask based on the performance indicator by retrieving a plurality of log mask values associated with the performance indicator from a storage unit and combines the plurality of log mask values associated with the performance indicator;
   collecting, by the processing unit of the diagnostic device, the log comprising data associated with the performance indicator based on the performance indicator log mask; and
   transmitting a signal to a wireless device to configure the wireless device to monitor the wireless communication system based on the performance indicator log mask.

8. The method of claim 7, wherein the processing unit retrieves the plurality of log mask values associated with the performance indicator by retrieving a plurality of log codes associated with the performance indicator from the storage unit, retrieving a log mask value associated with each log code of the plurality of log codes from the storage unit, and retrieving a user-defined key performance indicator log mask from the storage unit.

9. The method of claim 8, wherein the processing unit combines the plurality of log mask values associated with the performance indicator by performing a bit-wise logic operation between a binary representation of each log mask value of the plurality of log mask values.

10. The method of claim 9, wherein the bit-wise logic operation is one of an XOR operation and an OR operation.

11. The method of claim 9, wherein the communication system is a wireless communication system.

12. A diagnostic system for evaluating a wireless communication system comprising:
   a processor configured to receive a request from a user to generate a log comprising data associated with a performance indicator of a plurality of performance indicators of the wireless communication system, determine a performance indicator log mask based on the performance indicator, collect the log comprising data associated with the performance indicator based on the performance indicator log mask, and initiate a signal to a wireless device to configure the wireless device to monitor the communication system based on the log comprising data associated with the performance indicator of a plurality of performance indicators of the wireless communication system;
   a storage unit coupled to the processing unit configured to store a plurality of log masks associated with the plurality of performance indicators;
   a user interface coupled to the processing unit configured to receive user input and provide user output, wherein the user input comprises the request from the user to generate the log comprising data associated with the performance indicator of the plurality of performance indicators of the wireless communication system; and
   a wireless communication system interface coupled to the processing unit configured to monitor performance-related data of the wireless communication system and transmit the performance-related data to the processing unit.

13. The diagnostic system of claim 12, wherein the processor is further configured to determine the performance indicator log mask based on the performance indicator by retrieving a plurality of log mask values associated with the performance indicator and combining the plurality of log mask values associated with the performance indicator.

14. The diagnostic system of claim 13, wherein the storage unit is further configured to store a plurality of log codes associated with the plurality of performance indicators and the plurality of log masks, and
   the processor is further configured to retrieve the plurality of log mask values associated with the performance indicator by retrieving a plurality of log codes associated with the performance indicator from the storage unit, retrieving a log mask value associated with each log code of the plurality of log codes from the storage unit; and retrieving a user-defined performance indicator log mask from the storage unit.

15. The diagnostic system of claim 14, wherein the processor is further configured to combine the plurality of log mask values associated with the performance indicator by performing a bit-wise logic operation between a binary representation of each log mask value of the plurality of log mask values.

16. The method of claim 15, wherein the bit-wise logic operation is one of an XOR operation and an OR operation.

17. The method of claim 15, wherein the communication system is a wireless communication system.

18. A non-transitory computer-readable medium encoded with a computer-executable program which, when executed by a computer system configures the computer system to:
   receive a request from a user to generate a log comprising data associated with a performance indicator of a wireless communication system;
   determine a performance indicator log mask based on the performance indicator by retrieving a plurality of log mask values associated with the performance indicator from a storage unit and combining the plurality of log mask values associated with the performance indicator;
   collect the log comprising data associated with the performance indicator based on the performance indicator log mask; and
   transmit a signal to a wireless device to configure the wireless device to monitor the wireless communication system based on the performance indicator log mask.

19. The non-transitory computer-readable medium of claim 18, further configured to retrieve the plurality of log mask values associated with the performance indicator by retrieving a plurality of log codes associated with the performance indicator from the storage unit, retrieve a log mask value associated with each log code of the plurality of log codes from the storage unit, and retrieve a user-defined key performance indicator log mask from the storage unit.

20. The non-transitory computer readable medium of claim 19, further configured to combine the plurality of log mask values associated with the performance indicator by performing a bit-wise logic operation between a binary representation of each log mask value of the plurality of log mask values.

* * * * *